(12) United States Patent
Won et al.

(10) Patent No.: US 7,151,645 B2
(45) Date of Patent: Dec. 19, 2006

(54) INTERLEAVED REPEATABLE RUNOUT ESTIMATION

(75) Inventors: Justin Won, Longmont, CO (US);
Samir Mittal, Longmont, CO (US);
EweChye Tan, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 106 days.

(21) Appl. No.: 10/669,185

(22) Filed: Sep. 23, 2003

(65) Prior Publication Data

US 2005/0063086 A1    Mar. 24, 2005

(51) Int. Cl.
*G11B 5/596* (2006.01)
*G11B 21/02* (2006.01)

(52) U.S. Cl. .................. 360/77.04; 360/77.02
(58) Field of Classification Search .............. 360/25, 360/31, 53, 63, 75, 77.02, 77.04, 77.08, 77.09, 360/78.04, 78.14
See application file for complete search history.

(56) References Cited

U.S. PATENT DOCUMENTS

| | | | |
|---|---|---|---|
| 4,890,172 A | 12/1989 | Watt et al. | |
| 5,227,930 A | 7/1993 | Thanos et al. | |
| 5,550,685 A | 8/1996 | Drouin | |
| 5,886,846 A | 3/1999 | Pham et al. | |
| 5,995,316 A * | 11/1999 | Stich | 360/77.04 |
| 5,999,357 A | 12/1999 | Serrano | |
| 6,005,742 A | 12/1999 | Cunningham et al. | |
| 6,141,175 A * | 10/2000 | Nazarian et al. | 360/77.04 |
| 6,167,011 A | 12/2000 | Sun et al. | |
| 6,384,994 B1 | 5/2002 | Smith et al. | |
| 6,421,200 B1 | 7/2002 | Takaishi | |
| 6,437,936 B1 * | 8/2002 | Chen et al. | 360/77.04 |
| 6,445,531 B1 | 9/2002 | Gaertner et al. | |
| 6,476,995 B1 | 11/2002 | Liu et al. | |
| 6,510,015 B1 | 1/2003 | Sacks et al. | |
| 6,549,362 B1 | 4/2003 | Melrose et al. | |
| 6,707,635 B1 * | 3/2004 | Codilian et al. | 360/77.04 |
| 6,785,084 B1 * | 8/2004 | Szita | 360/77.04 |

* cited by examiner

*Primary Examiner*—Wayne Young
*Assistant Examiner*—Jason Olson
(74) *Attorney, Agent, or Firm*—Mitchell K. McCarthy

(57) ABSTRACT

A method and apparatus for reducing the effects of non-repeatable runout (NRRO) in the estimation of repeatable runout (RRO) in a disc drive is disclosed. PES information is a acquired in a way that leads to randomization of the phase of the NRRO, thereby decreasing the number of revolutions required to estimate the true RRO. A number of RRO estimation measurements are taken over a number of non-consecutive disc revolutions that are spaced in time. In one embodiment, one revolution of RRO data is collected from each head before collecting a second revolution of RRO data from any of the heads. In another embodiment, RRO estimation is concurrent with media certification, such that PES data is obtained while the head is in the write position and writes a track of data for media certification. Similarly, PES data for the read position is obtained while concurrently reading back the written data.

16 Claims, 2 Drawing Sheets

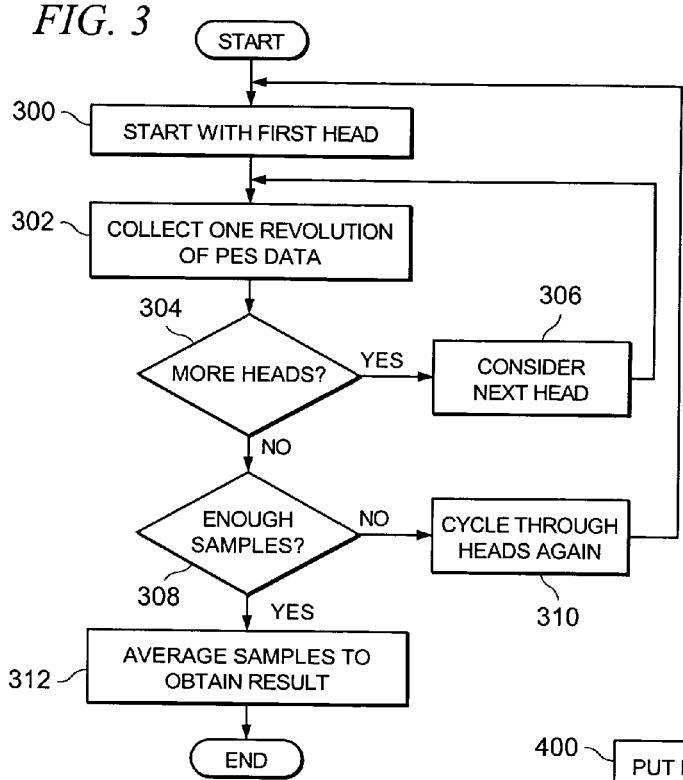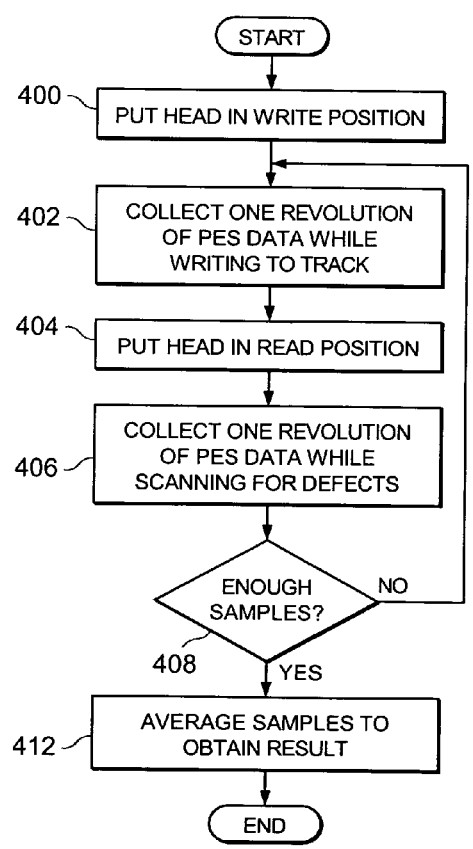

INTERLEAVED REPEATABLE RUNOUT ESTIMATION

FIELD OF THE INVENTION

The present invention relates generally to the area of disc drive control systems. Specifically, the present invention is directed to the estimation of repeatable runout for the purpose of proactively compensating for irregularities in the recording medium or disc drive mechanics.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks. The data tracks are spaced radially from one another across a band having an inner diameter and an outer diameter.

Each of the data tracks extends generally circumferentially around the disk and can store data in the form of magnetic transitions within the radial extent of the track on the disk surface. An interactive element, such as a magnetic transducer, is used to sense the magnetic transitions to read data, or to transmit an electric signal that causes a magnetic transition on the disk surface, to write data. The magnetic transducer includes a reader and a writer that contain the active elements of the transducer at a position suitable for interaction with the magnetic surface of the disk. The radial dimension of the reader and the writer elements in the interactive element, fits within the radial extent of the data track containing the transitions, so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disk to either read data from or write data to the preselected data track of the disk, as the disk rotates below the transducer. The actuator arm is, in turn, mounted to a voice coil motor that can be controlled to move the actuator arm across the disk surface.

A servo system is typically used to control the position of the actuator arm to insure that the head is properly centered over the magnetic transitions during either a read or write operation. In the servo system, servo position information is recorded on the disk surface between written data blocks, and periodically read by the head for use in a closed loop control of the voice coil motor to position the actuator arm. Such a servo arrangement is referred to as an embedded servo system.

In modern disk drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the sensed signals are transmitted to, e.g., a microprocessor within the disk drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

A closed-loop track-following servo, as described above, is sufficient for track following in the absence of major irregularities of the recording medium or drive mechanics. An entirely closed-loop system has a harder time correcting for larger and more abrupt irregularities. For certain kinds of disc drive irregularities, however, a combination of feedback and feedforward techniques can be employed to enhance the track-following ability of the servo control system.

Repeatable Run Out (RRO) is an actuator arm positioning error that occurs regularly with each revolution of the disc. A typical situation in which RRO occurs is when the tracks on the disc are not perfect circles, although one of ordinary skill in the art will recognize that this is not the only situation in which RRO occurs. In such cases, the track-following servo must cause the actuator arm to move radially with respect to the disc to roughly the same degree at each revolution. It is a well-known practice in the art to measure the degree of RRO (i.e., the amount of actuator arm movement necessary to compensate for RRO) and store this information on the disc or in a non-volatile memory, so that a feedforward signal may be applied to the servo loop in order to proactively compensate for RRO. This measurement of the degree of RRO is called "RRO estimation." An example of using stored parameters from RRO estimation to compensate for RRO is provided by commonly assigned U.S. Pat. No. 5,585,976 to Ich V. Pham.

"RRO estimation" is aptly named, since an exact measurement is virtually impossible, from a practical standpoint. That is because the actual positioning errors experienced by the actuator arm and the actual correction that must be applied to those errors are dependent on more than just RRO. RRO is a steady-state error. Disc drives, exhibit both steady-state and transient behavior. The transient behavior of a disc drive actuator arm is dependent on many factors, including external forces (e.g., operating vibration and shock on a disk drive) or the physical characteristics of the drive itself (e.g., a resonant frequency of the drive).

Since disc drives exhibit both steady-state errors (RRO) and transient errors (non-repeatable runout or NRRO), a goal of RRO estimation is to reduce or eliminate the effects of NRRO in the measurements taken. An existing strategy for addressing this problem is to take a series of measure ments from a number of consecutive revolutions of the disc and use averaging or some other mathematical technique to reduce the "outliers" in the measurement data so as to achieve a realistic estimate of the RRO. This process is typically done as part of the manufacturer's media certification process, in which the disc drive is scanned for defects in the recording medium.

While this existing approach is theoretically sound, this approach is not immune from problems. In particular, sometimes a positioning error that resembles RRO will actually be due to NRRO. For example, an external force applied to the disc drive may cause the actuator arm or recording medium to move in a periodic fashion, due to mechanical resonances in the arm's natural response characteristic. Over a number of consecutive revolutions of the disc, this periodic behavior may not be readily distinguishable from RRO, and the RRO compensation estimated during that period may contain spurious compensation data as a result.

Thus, a need exists for an RRO estimation scheme that efficiently minimizes the introduction of spurious compensation data due to NRRO. The present invention provides a solution to this and other problems, and offers other advantages over previous solutions.

SUMMARY OF THE INVENTION

The present invention provides a method and apparatus for reducing the effects of non-repeatable runout (NRRO) in the estimation of repeatable runout (RRO) in a disc drive. One embodiment of the present invention takes a number of RRO estimation measurements over a number of non-consecutive disc revolutions that are spaced in time. In another embodiment, one revolution of RRO data is collected from each head before collecting a second revolution of RRO data from any of the heads. In yet another embodiment, RRO estimation takes place concurrently with media certification, such that one revolution of data is obtained while the head is in the write position and writes a track of data to the disc and the next revolution of data is obtained after moving the head into position for reading and while concurrently reading back the written data from the disc. These and various other features, as well as advantages that characterize the present invention, will be apparent upon reading of the following detailed description and review of the associated drawings.

BRIEF DESCRIPTION OF THE DRAWINGS

FIG. 3 is a flowchart representation of a process of estimating RRO in accordance with one embodiment of the present invention; and FIG. 4 is a flowchart representation of a process of estimating RRO in accordance with an alternative embodiment of the present invention.

DETAILED DESCRIPTION

Figure 1:
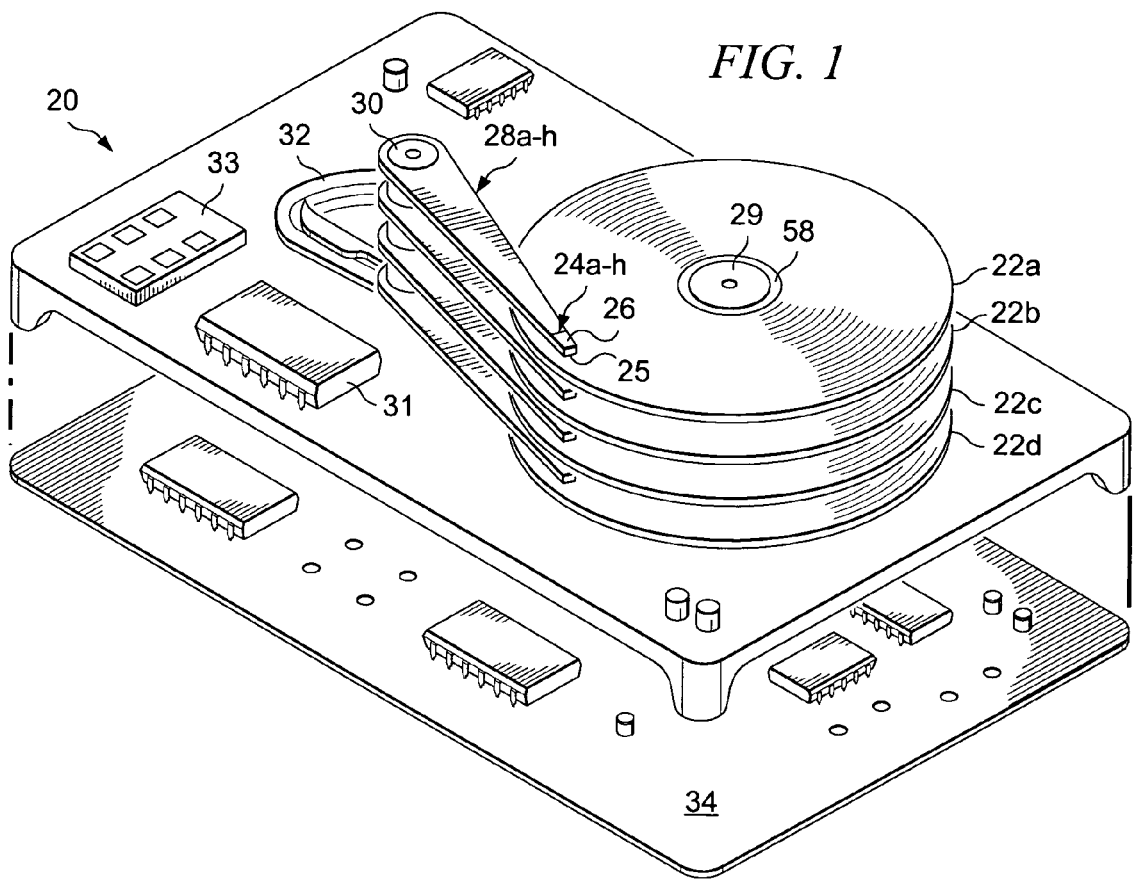
FIG. 1 is an exemplary perspective view of an exemplary disc drive.

Referring now to the drawings, and initially to FIG. 1, there is illustrated an example of a disc drive designated generally by reference numeral 20. Disc drive 20 includes a stack of storage discs 22a–d and a stack of read/write heads 24a–h. Each of storage discs 22a–d is provided with a plurality of data tracks to store user data. As illustrated in FIG. 1, one head is provided for each surface of each of storage discs 22a–d such that data can be read from or written to the data tracks of all of the storage discs. The heads are coupled to pre-amplifier 31. It should be understood that disc drive 20 is merely representative of a disc drive system utilizing the present invention and that the present invention can be implemented in a disc drive system including more or less storage discs.

Storage discs 22a–d are mounted for rotation by spindle motor arrangement 29, as is known in the art. Moreover, read/write heads 24a–h are supported by respective actuator arms 28a–h for controlled positioning over preselected radii of storage discs 22a–d to enable the reading and writing of data from and to the data tracks. To that end, actuator arms 28a–h are rotatably mounted on pin 30 by voice coil motor 32 operable to controllably rotate actuator arms 28a–h radially across the disc surfaces.

Each of read/write heads 24a–h is mounted to a respective one of actuator arm 28a–h by a flexure element (not shown) and comprises a magnetic transducer 25 mounted to slider 26 having an air bearing surface (not shown), all in a known manner. As typically utilized in disc drive systems, sliders 26 cause magnetic transducers 25 of the read/write heads 24a–h to "fly" above the surfaces of the respective storage discs 22a–d for non-contact operation of the disc drive system, as discussed above. When not in use, voice coil motor 32 rotates actuator arms 28a–h during a contact stop operation, to position read/write heads 24a–h over a respective one of landing zones 58 or 60, where read/write heads 24a–h come to rest on the storage disc surfaces. As should be understood, each of read/write heads 24a–h is at rest on a respective one of landing zones 58 or 60 at the commencement of a contact start operation.

Magnetic transducer 25 has both adjacent read and write elements (not shown) that are used to actually read and write data to and from the surface of a storage disc. Since these read and write elements are mounted adjacent to each other, read/write heads 24a–h will be positioned by actuator arms 28a–h in a slightly different radial position with respect to storage discs 22a–d when reading than when writing. When a head is positioned for reading from a specific track, the head is said to be in the "read position." Likewise, when a head is positioned for writing to that same specific track, the head is said to be in the "write position."

Printed circuit board (PCB) 34 is provided to mount control electronics for controlled operation of spindle motor 29 and voice coil motor 32. PCB 34 also includes read/write channel circuitry coupled to read/write heads 24a–h via pre-amplifier 31, to control the transfer of data to and from the data tracks of storage discs 22a–d. The manner for coupling PCB 34 to the various components of the disc drive is well known in the art, and includes connector 33 to couple the read/write channel circuitry to pre-amplifier 31.

Figure 2:
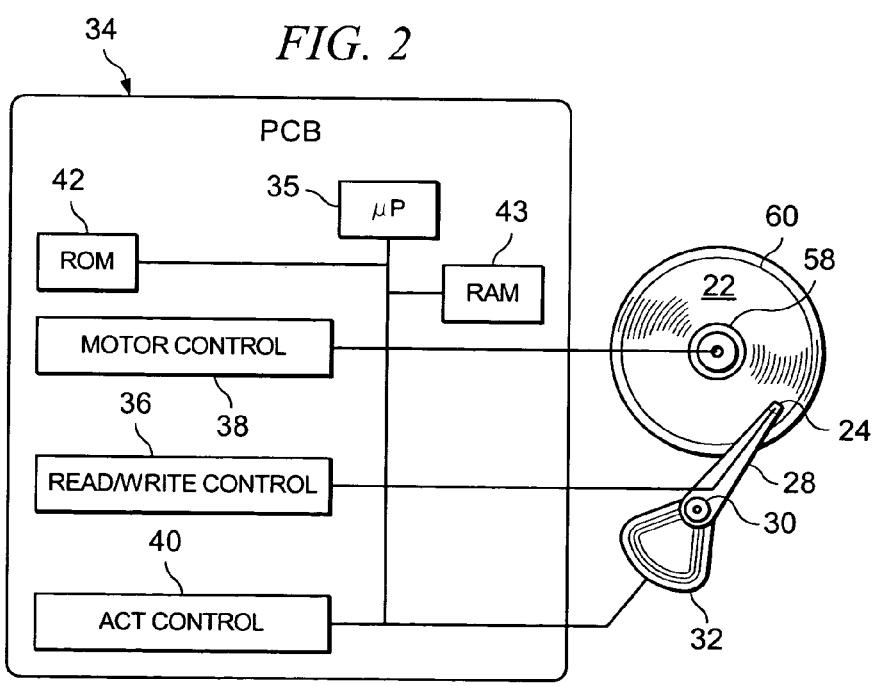
FIG. 2 is an exemplary top plan view of the printed circuit board of the exemplary disc drive of FIG. 1.

Referring now to FIG. 2, there is illustrated in schematic form PCB 34 and the electrical couplings between the control electronics on PCB 34 and the components of the disc drive system described above. Microprocessor 35 is coupled to each of read/write control 36, spindle motor control 38, actuator control 40, ROM 42 and RAM 43. In modern disc drive designs, the microprocessor can comprise a digital signal processor (DSP). Microprocessor 35 sends data to and receives data from storage discs 22a–d via read/write control 36 and read/write heads 24a–h.

Microprocessor 35 also operates according to instructions stored in ROM 42 to generate and transmit control signals to each of spindle motor control 38 and actuator control 40, and read/write control 36.

Spindle motor control 38 is responsive to the control signals received from microprocessor 35 to generate and transmit a drive voltage to spindle motor 29 to cause storage discs 22*a–d* to rotate at an appropriate rotational velocity.

Similarly, actuator control 40 is responsive to the control signals received from microprocessor 35 to generate and transmit a voltage to voice coil motor 32 to controllably rotate read/write heads 24*a–h*, via actuator arms 28*a–h*, to preselected radial positions over storage discs 22*a–d*. The magnitude and polarity of the voltage generated by actuator control 40, as a function of the microprocessor control signals, determines the radial direction and radial speed of read/write heads 24*a–h*.

When data to be written or read from one of storage discs 22*a–d* are stored on a data track different from the current radial position of read/write heads 24*a–h*, microprocessor 35 determines the current radial position of read/write heads 24*a–h* and the radial position of the data track where read/write heads 24*a–h* are to be relocated. Microprocessor 35 then implements a seek operation wherein the control signals generated by microprocessor 35 for actuator control 40 cause voice coil motor 32 to move read/write heads 24*a–h* from the current data track to a destination data track at the desired radial position.

When the actuator has moved read/write heads 24*a–h* to the destination data track, a multiplexer (not shown) is used to couple read/write heads 24*a–h* over the specific data track to be written or read, to read/write control 36, as is generally known in the art. Read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of read/write control 36 for processing via pre-amplifier 31. Random access memory (RAM) 43 can be used to buffer data read from or to be written to the data sectors of storage discs 22*a–d* via read/write control 36. The buffered data can be transferred to or from a host computer utilizing the disc drive for data storage.

The present invention provides a method and apparatus for reducing the effects of non-repeatable runout (NRRO) in the estimation of repeatable runout (RRO) in a disc drive. A preferred embodiment of the present invention is implemented in the form of program code executed by a microprocessor, such as microprocessor 35 in FIG. 2, in the control circuitry of a disc drive, such as disc drive 20 in FIG. 1. The program code is executed to direct the disc drive to read a position error signal (PES) for various tracks. In order to lessen the effects of NRRO on the PES measurements, PES data for a single track is acquired over multiple revolutions of the disc and the recorded PES measurements are mathematically combined so as to reduce the effect of transient phenomena. In a preferred embodiment, this mathematical combination is performed by obtaining the arithmetic mean of corresponding PES measurements (i.e., averaging the PES measurements), although one of ordinary skill in the art will recognize that a number of other known mathematical and statistical techniques may be employed to reduce the effect of transient behaviors, such as by taking a geometric mean, discarding measurements that occur infrequently (outliers), and the like.

A preferred embodiment of the present invention reduces the effect of NRRO on PES measurements by employing the general strategy of spacing the acquisition of repeated PES measurements over time so that PES measurements for a single recording surface and head are performing only in non-consecutive revolutions of the disc. By employing this strategy, a preferred embodiment of the present invention reduces the effects of NRRO by allowing sufficient time for the NRRO behavior to have shifted in phase with respect to the rotation of the disc. In the best case, the phase of the NRRO in non-consecutive revolutions becomes completely random, leading to accelerated convergence in the averaging process to the true value of the RRO. This technique is based on the observation that the same NRRO behavior does not occur repeatably at one given location on the disc at each revolution.

One of ordinary skill in the art will recognize that some additional calculations may be involved in converting raw PES data into a feedforward signal or other compensation value that can be applied to a disc drive servo control system to compensate for RRO. The conversion of a PES signal into compensation information is dependent upon the design of the servo control system itself. However, one of ordinary skill in the art will recognize that the teachings of the present invention may be applied without regard for the specific method in which PES data is converted into RRO compensation information, since the present invention addresses the more general problem of reducing the number of revolutions required to estimate the true RRO from an acquired PES. This acquired PES may then be used in computing the actual RRO compensation values applied to the disc drive control system. Thus, no further discussion is made here regarding the application of PES data to RRO compensation, and the reader's attention is directed toward FIGS. 3 and 4, which describe the acquisition of PES data in accordance with preferred embodiments of the present invention.

FIG. 3 is a flowchart representation of a process of acquiring PES in accordance with an embodiment of the present invention. The process depicted in FIG. 3, loops sequentially through the entire set of heads, collecting one revolution of PES data from each head before proceeding to collect second or subsequent revolutions of PES data from any of the heads. The process starts by considering the first head (step 300). PES readings for one revolution of the disc corresponding to that head are collected (step 302). These PES readings will generally take the form of a series of PES values $\{p_1, p_2, \ldots, p_n\}$ corresponding to various locations on the circumference of a particular track. If the disc drive has additional heads from which PES readings have not yet been collected (step 304:Yes), the next head in the sequence is considered (step 306) and the process loops back to step 302.

Once PES readings have been collected from all of the heads (step 304:No), a determination is made as to whether a sufficient number of revolutions of PES data (i.e., enough "samples" of PES data) have been collected for each head (step 308). In a preferred embodiment, the number of revolutions of PES data collected for each head will be some pre-determined constant, such as 8 or 10. If fewer than the required number of revolutions of PES data have been collected (step 308:No), the process cycles through the entire set of heads again (step 310) and loops back to step 300.

Once the required number of revolutions of PES data have been collected (step 308:Yes), the PES measurements collected for a particular head are averaged or otherwise combined to obtain a result that estimates the PES due to RRO only (i.e., without NRRO). For example, if P, Q, and R represent three revolutions of PES data collected for a particular head at a particular track, where $P=\{p_1, p_2, \ldots, p_n\}$, $Q=\{q_1, q_2, \ldots, q_n\}$, and $R=\{r_1, r_2, \ldots, r_n\}$, then the result of averaging the three revolutions of PES data could be written as $A=\{a_1, a_2, \ldots, a_n\}$, where for each $a_i$ in A, $a_i=(p_i+q_i+r_i)/3$.

One of ordinary skill in the art will recognize that the process of FIG. 3 can also be repeated for different tracks to estimate the RRO at each track, so that a result is obtained for Track 1 of each storage disc surface, then a result is obtained for Track 2 of each storage disc surface, and so on, until the RRO of each track on each storage disc surface is estimated.

FIG. 4 is a flowchart representation of a process of estimating RRO in accordance with an alternative embodiment of the present invention. The embodiment described in FIG. 4 interleaves PES acquisition for the read position of the head with the PES acquisition for the write position of the head. This again helps in the randomization of the phase of the NRRO, as the estimation of RRO for either the write position of the head or the read position of the head (which are separately estimated parameters), is performed on non-consecutive revolution of PES. The general strategy of the embodiment described in FIG. 4 is to alternate the position of the head between the read position and the write position while collecting PES data. This strategy prevents the acquisition of two consecutive revolutions of PES data for the same head in the same position. An additional advantage to this approach is that it is easily combined with scanning the disc for bad blocks during media certification, as shown in FIG. 4.

FIG. 4 describes how the RRO for a single head at a single track may be estimated in accordance with a preferred embodiment of the present invention. The head is placed in the write position (block 400). One revolution of PES data is collected while writing a set of test data to the track (block 402), and corresponds to the write position of the head. The head is placed in the read position (block 404). A first revolution of PES data is collected while the test data is being read back from the track (block 406) for the read position of the head. If more samples of PES data need to be collected for the track (block 408:No), then the process loops back to block 402. Otherwise (block 408:Yes), the PES samples acquired at the write position are averaged together to obtain an estimation of the RRO for the write position, and, similarly, the PES samples acquired at the read position are averaged together to estimate the RRO for the read position of the head.

One of ordinary skill in the art will also recognize that the processes described in FIGS. 3 and 4 may also be merged, so that, for example, one revolution of PES data is collected while writing with the first head, then one revolution of PES data is collected while writing with the next head, and so on until the last head is reached, then another revolution of PES data is collected while reading from the first head, then the next head, and so on. Since the general strategy behind the processes depicted in both FIG. 3 and FIG. 4 is to avoid taking measurements of the same track and head in the same position in consecutive revolutions of the disc, these two particular processes may be readily combined in a number of different looping arrangements that will be apparent to those skilled in the art in view of the foregoing discussion.

Thus, a novel method and apparatus for estimating RRO in a disc drive are herein disclosed and characterized by steps of reading a position error signal of a first head for a first revolution of the disc drive to obtain first position error signal data; reading a position error signal of a second head for a second revolution of the disc drive to obtain second position error signal data, wherein the second revolution of the disc drive immediately follows the first revolution of the disc drive; reading a position error signal of the first head for a later revolution of the disc drive to obtain third position error signal data, wherein the later revolution of the disc drive occurs at a later time than the second revolution of the disc drive; and combining the first position error signal data with the third position error signal data to obtain an estimate of repeatable runout for the first head.

It is important to note that while the present invention has been described in the context of a fully functioning disc drive and associated circuitry, those of ordinary skill in the art will appreciate that the processes of the present invention are capable of being distributed in the form of a computer-readable medium of instructions or other functional descriptive material and in a variety of other forms and that the present invention is equally applicable regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
    reading position error signals of a first head for non-consecutive revolutions to obtain position error signal data; and
    combining the position error signal data from one of the non-consecutive revolutions with the position error signal data from another one of the non-consecutive revolutions to obtain an estimate of repeatable runout for the first head.

2. The method of claim 1, further comprising reading a position error signal of another head for at least one additional revolution of the disc drive, wherein the at least one additional revolution of the disc drive takes place between the non-consecutive revolutions.

3. The method of claim 1, wherein the estimate of repeatable runout for the first head is obtained by combining the position error signal data with additional position error signal data for the first head.

4. The method of claim 1, wherein the position error signal data are combined by averaging.

5. The method of claim 1, further comprising recording the estimate of repeatable runout for the first head for use in repeatable runout compensation.

6. The method of claim 5, wherein the estimate of repeatable runout for the first head is recorded on a disc surface.

7. The method of claim 5, wherein the estimate of repeatable runout for the first head is recorded in a memory.

8. An apparatus comprising:
a storage medium having at least one recording surface that includes position information;
a transducer associated with the one recording surface, wherein a position error signal is generatable when the position information is read by the transducer;
a moveable assembly upon which the transducer is mounted, wherein a range of mobility of the moveable assembly allows the transducer to be positioned as necessary to allow the transducer to follow a path on the recording surface; and
control circuitry adapted to estimate repeatable runout by performing actions that include:
reading position error signals of the transducer for non-consecutive revolutions to obtain position error signal data; and
combining the position error signal data of two or more of the non-consecutive revolutions to obtain an estimate of repeatable runout for the transducer.

9. The apparatus of claim 8, wherein the control circuitry is adapted to perform an additional action of reading a position error signal of another transducer for at least one additional revolution of the storage medium, wherein the at least one additional revolution of the storage medium takes place between the non-consecutive revolutions of the storage medium.

10. The apparatus of claim 8, wherein the estimate of repeatable runout for the transducer is obtained by combining the position error signal data additional position error signal data for the transducer.

11. The apparatus of claim 8, wherein the position error signal data are combined by averaging.

12. The apparatus of claim 8, further comprising recording the estimate of repeatable runout for the transducer for use in repeatable runout compensation.

13. The apparatus of claim 12, wherein the estimate of repeatable runout for the transducer is recorded on at least one of the recording surfaces.

14. The apparatus of claim 12, wherein the estimate of repeatable runout for the first transducer is recorded in a memory.

15. The apparatus of claim 8, wherein the control circuitry includes a microprocessor.

16. Control circuitry adapted to estimate repeatable runout by performing actions that include:
reading position error signals for non-consecutive revolutions to obtain position error signal data; and
combining the position error signal data of two or more of the non-consecutive revolutions to obtain an estimate of repeatable runout.

* * * * *